United States Patent [19]

Wilson

[11] Patent Number: 4,476,669
[45] Date of Patent: Oct. 16, 1984

[54] TOBACCO COMBINE WITH SELECTIVE CONVEYOR RAISING

[75] Inventor: Robert W. Wilson, Charlotte, N.C.

[73] Assignee: Powell Manufacturing Company, Inc., Bennettsville, S.C.

[21] Appl. No.: 432,855

[22] Filed: Oct. 5, 1982

[51] Int. Cl.³ .............................................. A01D 45/16
[52] U.S. Cl. ...................................... 56/27.5; 56/14.5
[58] Field of Search ............................... 56/27.5, 14.5

[56] References Cited

U.S. PATENT DOCUMENTS

| | | | |
|---|---|---|---|
| 3,093,949 | 6/1963 | Splinter | 56/27.5 |
| 3,772,862 | 11/1973 | Wilson | 56/27.5 |
| 4,136,465 | 1/1979 | Wilson | 34/210 |
| 4,142,350 | 3/1979 | Griner et al. | 56/27.5 |
| 4,178,745 | 12/1979 | Wilson | 56/27.5 |
| 4,192,124 | 3/1980 | Balthes | 56/27.5 |
| 4,332,128 | 6/1982 | Prince | 56/27.5 |

Primary Examiner—Paul J. Hirsch
Attorney, Agent, or Firm—Cushman, Darby & Cushman

[57] ABSTRACT

A tobacco combine comprising a frame operable to be moved along a row of tobacco plants in a tobacco field, a pair of cooperating power driven mechanical tobacco defoliating units mounted on the frame for (1) movement therewith along the row of tobacco plants on opposite sides of a predetermined vertical extent of the stalks of the tobacco plants for removing tobacco leaves attached to the portion of the stalks within the predetermined vertical extent and (2) vertical movements with respect to the frame within (a) an operative range for varying the predetermined vertical extent of the stalks and (b) above the operating range for clearance purposes, a power driven longitudinal conveyor assembly disposed laterally outwardly from each defoliating unit for receiving leaves directed laterally thereby and moving the same rearwardly, a manually adjustable strut assembly for supporting the forward end of each longitudinal conveyor from the frame against a downward movement below a selected position of adjustment but permitting upward movement above the selected position of adjustment, and a lost motion connection operatively connected between the defoliator units and the forward end of each of the longitudinal conveyor assemblies.

14 Claims, 3 Drawing Figures

TOBACCO COMBINE WITH SELECTIVE CONVEYOR RAISING

This invention relates to tobacco combines or harvesters and more particularly to improvements in tobacco harvesters of the type disclosed in U.S. Pat. Nos. 3,772,862 and 4,178,745.

The type of tobacco combine or harvester disclosed in the aforesaid patents includes a vehicle frame capable of being moved through a tobacco field. Mounted on the frame are side-by-side mechanical power driven defoliating units cooperating with one another to remove a swath of leaves from a row of tobacco plants as the vehicle moves down a tobacco row. The harvester may be either a single row machine (U.S. Pat. No. 3,772,862) which includes a single pair of defoliator units or a double row machine (U.S. Pat. No. 4,178,745) which includes two pairs of cooperating defoliator units. Each pair of defoliator units serves to strip the leaves from the tobacco plants and deliver the same laterally in both directions outwardly from the row. The delivered leaves are received by receiving conveyors forming with the defoliator units a header assembly which serves to deliver the leaves laterally outwardly to the forward receiving ends of longitudinally extending conveyor assemblies. Each longitudinally extending conveyor assembly moves the received leaves horizontally rearwardly where they are picked up by an upwardly extending conveyor assembly which serves to move the leaves upwardly above an elevated platform on the vehicle on which a suitable leaf receptacle is mounted. The upwardly extending conveyor sections discharge the leaves into the leaf receptacle and, when appropriate, a leaf distributing mechanism may be provided (as in U.S. Pat. No. 4,178,745) for insuring that the discharging leaves are distributed evenly into the receptacle.

In the normal operation of these harvester, a number of different passes through the field are undertaken periodically during the harvesting season in order to remove progressively higher swaths of leaves from each stalk as they ripen. In order to enable the harvester to remove a swath of leaves progressively higher up on the stalks during each periodic pass it is necessary to adjust the vertical position of the header assembly or assemblies with respect to the vehicle frame. For this purpose, the header assembly or assemblies are mounted for such vertical movement through the operation of a hydraulic cylinder or other power driven instrumentality.

The longitudinally extending conveyor assemblies are mounted separately from the header assemblies and this separate mounting as disclosed in the aforesaid patents is simply a separate adjustable mount rather than a power driven vertically movable mount.

While this non-power adjusting system was adequate in effecting the adjustments of the longitudinal conveyor assemblies required to accommodate the different positions of operation of the associated header assembly, there still remained a vertical positioning problem with respect to the longitudinal conveyor assemblies during the movement within the field at any one setting, particularly the lower setting. This problem involved the need to turn the vehicle within the field at the end of the rows. While it would be possible to leave turning room at the end of the field, good practice dictates the planting of as many plants as possible which can be serviced in the same field. Consequently, it is often the case when turning the vehicle at the end of a row that the wheels must travel over one or more rows, bringing the tops of the rows traversed by the vehicle frame into closer proximity to the bottom of the longitudinal conveyors. It has been proposed to mount the rearward end of the longitudinal conveyor assemblies for power driven vertical movement by mounting the upright conveyor assemblies for power driven vertical movement and mounting the rearward discharge end of the associated longitudinal conveyor assembly for movement therewith. In this way, the feeding relationship between the rearward end of the longitudinal conveyor assembly and the lower end of the associated upright conveyor assembly are maintained throughout the range of power driven vertical movement provided. However, this movement alone without the ability to also raise and lower the front end of the longitudinal conveyor assembly has not provided a total solution to the problem. The forward end of each longitudinal conveyor assembly was provided with a manually adjustable support, however, this support was extremely difficult to adjust manually, requiring the manual lifting of the forward end of the associated conveyor assembly.

It is an object of the present invention to provide a total system for raising and lowering by power both the front and rear ends of the longitudinal conveyor assemblies while still maintaining the desirable independence between the vertical movement of the header and the movement of the conveyor assemblies. In accordance with the principles of the present invention this objective is obtained by providing a lost motion connection operatively between the defoliator units and the forward end of each of the longitudinal conveyor assemblies for (1) enabling the power operated means for moving the defoliator units vertically to effect such movement within an operating range without effecting any vertical movement of the forward end of either of the longitudinal conveyor assemblies and (2) effecting an upward movement of the forward end of each of the longitudinal conveyor assemblies above the selected position of manual adjustment thereof in response to the upward movement of the associated defoliator units by the associated power operated means upwardly above the predetermined operating range of vertical movements thereof and by so doing to transfer the support of the front end of each longitudinal conveyor assembly from the manually adjustable means to the lost motion connection thereby enabling the manually adjustable means to be manually adjusted while out of supporting relation with the forward end of the associated longitudinal conveyor assembly.

Accordingly it is a further object of the present invention to provide a tobacco combine of the type described having improved means for effecting selective vertical movement of the longitudinally extending conveyor assemblies thereof which is simple in construction, effective in operation and economical to manufacture and maintain.

The invention may best be understood with reference to the accompanying drawings, wherein an illustrative embodiment is shown.

Figure 1:
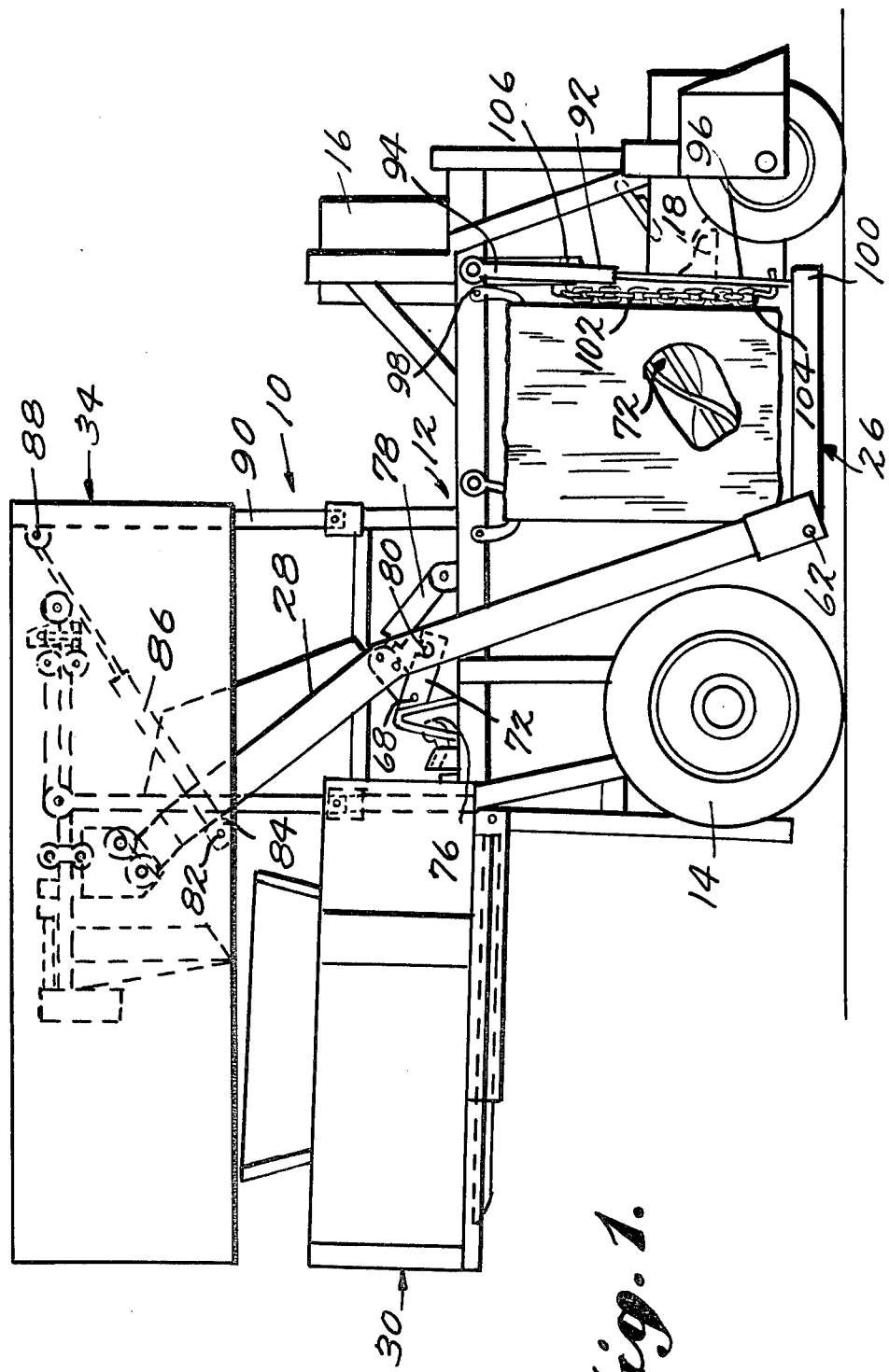
FIG. 1 is a side elevational view of a tobacco combine embodying the principles of the present invention.

Referring now more particularly to the drawings, there is shown therein a tobacco combine, generally indicated at 10, which embodies the principles of the present invention. In general, the combine 10 may be constructed in a manner similar to the combine disclosed in the aforesaid commonly assigned U.S. Pat. Nos. 3,772,862 and 4,178,745, the disclosures of which are hereby incorporated by reference into the present specification. Except for the modifications and improvements embodying the principles of the present invention, the combine 10 may consist of components constructed as set forth in the aforesaid patents or in any one of the commercial combines manufactured by the owner of this application and the aforesaid patents as, for example, those marketed under the trademarks RANDOMLOAD GENERATION III and EVENLOAD GENERATION III. Similarly, the principles of the present invention are likewise applicable to other combines and harvesters commercially marketed.

The basic components of the combine include a frame structure or assembly, generally indicated at 12, which is adapted to be moved along a tobacco row in a field. While it is within the contemplation of the present invention to utilize a tractor mounted frame assembly, preferably the frame assembly 12 is self-supporting, as by a series of ground-engaging wheels 14. Here again, the wheeled frame may be a pull-behind type, however as shown, it is preferable that the frame assembly be self-propelled, and for this purpose there is provided an engine 16 for powering a hydraulic pump (not shown) which, in turn, provides the motive power for the combine. An operator's seat 18 is provided in the forward end of the frame for positioning the operator so as to conveniently utilize a steering wheel 20 for the forward steerable wheels 14 supporting the frame assembly 12.

The vehicle frame 12 is fixed to accommodate components which render the combine capable of operating either on a single row of tobacco plants during its movement through the field or two adjacent rows. It will be understood that the components are essentially the same for each row, including a pair of defoliator units 22 including leaf receiving means 24 for receiving the tobacco leaves removed by the defoliator units laterally away from the row, a longitudinally extending conveyor assembly 26 adjacent each leaf receiving means 24 for receiving the leaves moved laterally thereby and for conveying the same rearwardly. An upright conveyor assembly 28 is provided for each conveyor assembly 26, which conveyor assembly has a receiving end disposed in cooperating relation with the rearward end of each longitudinal conveyor assembly to receive the leaves discharged therefrom and convey the same upwardly for discharge into a suitable receptacle 30 supported in an elevated position on the frame assembly 12, as by an elevator assembly 32 or the like. Where the nature of the leaf handling operation requires, a leaf distributing mechanism, generally indicated at 34 (see U.S. Pat. No. 4,178,745), may be interposed between the discharge of the upright conveyor assemblies 28 and the receptacle 30. In general, it can be stated that where the receptacle 30 constitutes a high capacity curing structure, as taught in U.S. Pat. No. 4,136,465, it is desirable to utilize the leaf distributing mechanism 34. On the other hand, where the receptacle is simply a container within which the leaves are adapted to be transported to another site for handling, the leaf distributing mechanism may be omitted.

It will be understood that in a two-row combine the two innermost longitudinal and upright conveyor assemblies can be integrated into single assemblies of extended width. Otherwise the components are simply duplicated for a two-row installation and hence a description of the invention as applied to a single row unit should suffice to provide an understanding of both single row and double row operation.

As described in U.S. Pat. No. 3,772,862, each pair of cooperating defoliating units 22 is mounted on the frame assembly 12 so that the units of the pair are mounted on opposite sides of the tobacco row during the movement of the vehicle frame assembly 12 through the field. Each unit 22 includes a power driven defoliating mechanism 36 which may be of the spiral rubber wiper type, as shown, or of a type embodying a multiplicity of multiple knives, as disclosed in U.S. Pat. No. 3,093,949 (see also commonly assigned U.S. Pat. application Ser. No. 343,525 filed Jan. 28, 1982).

Each defoliating mechanism 36 serves to remove the leaves from a tobacco stalk engaged thereby and to deposit the removed leaves on a power driven leaf receiving means 38 which serves to move the leaves laterally outwardly in relation to the tobacco row from which the leaves are removed. Each defoliator mechanism 36 and associated leaf receiving mechanism 38 is mounted on a suitable frame structure 40 which, in turn, is mounted for power operated vertical movement on the main vehicle frame assembly 12. As shown, this mounting includes a pair of vertically extending channel members 42 fixed to the forward end portion of the frame assembly 12 in vertical parallel relation with their channels opening toward one another. The upper ends of the channels are rigidly connected by a cross brace 44 and a carriage assembly 46 having rollers 48 on each side thereof engaged within the channels 42 is mounted for vertical movement in this way within the channels 42. Each frame structure 40 is supported on an associated side of the carriage assembly 46 as indicated at 50. It can thus be seen that by raising and lowering the carriage 46, frames 40 and the associated defoliating mechanisms 36 and leaf receiving mechanisms 38 will be moved vertically therewith.

To accomplish the vertical movement there is provided a hydraulic piston and cylinder unit 52, one end of which is connected with the frame assembly 12 and the opposite end of which is connected to a cross member 54 having a pair of cables 56 connected therewith. Cables 56 extend around suitable pulleys 58 fixedly mounted with respect to the vehicle frame assembly 12, the last two of which are suspended from the crossmember 44 enabling the opposite ends of the cables 56 to extend downwardly for attachment to the carriage 46, as indicated at 60. It will be understood that the above arrangement for effecting the raising and lowering of the pair of defoliator units 22 thus far described is essentially the same as that described in the aforesaid U.S. Pat. No. 3,772,862.

Figure 2:
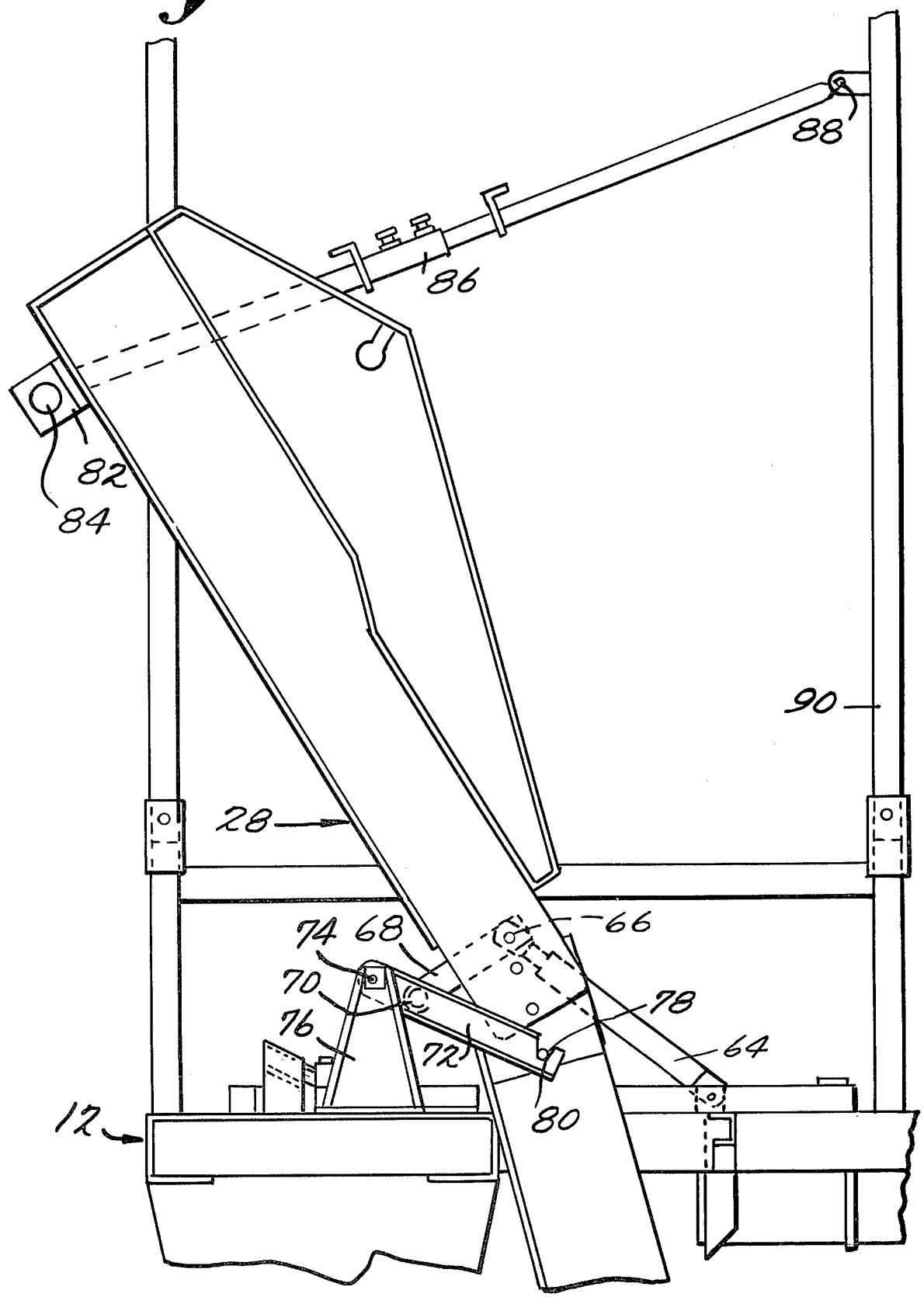
FIG. 2 is a fragmentary side elevational view illustrating the manner in which the upright conveyor assemblies of the combine are power operated for vertical movement.

The improvements embodying the principles of the present invention relate to the arrangement for effecting power operated vertical movement of the conveyor assemblies 26 and 28 while still maintaining the desirable independence between the vertical movement of the defoliator units 22 and the conveyor assemblies. To this end, it will be noted that the rearward end of each longitudinally extending conveyor assembly 26 is pivotally supported, as at 62, by the lower receiving end of the associated upright conveyor assembly 28. As best shown in FIG. 2, each upright conveyor assembly 28 is mounted on the associated frame assembly 12 for power operated vertical movement by a hydraulic piston and cylinder unit 64, one end of which is pivoted to the vertical frame assembly 12 and the opposite end of which is pivoted, as indicated at 66, to the outer end of an arm 68, the inner end of which is fixed to the central portion of a tubular cross member 70. The end of the cross member 70 are rigidly secured to a pair of levers 72. The rearward ends of the levers 72 are pivoted, as indicated at 74, on the vehicle frame 12 as by a pair of upstanding brackets 76. The forward end portions of the levers 72 are notched as indicated at 78, to receive therein pivot pins 80 fixed to the sides of the associated upright conveyor assembly frame. It can be seen that by expanding the hydraulic piston and cylinder unit 64, levers 72 are pivoted about fixed pivot points 74 to move the supporting pivot pins 80 upwardly to lift the conveyor assembly 28.

In order to provide a further guidance for the upper discharge end of the conveyor assembly 28 there is provided a pair of transversely spaced brackets 82 on the rearward side portions of the associated upright conveyor assembly 28. Brackets 82 are apertured to rotatably receive therein a hollow shaft 84 which has its inner end fixedly connected to the rear end of an adjustable strut assembly 86. The end of the adjustable strut assembly 86 is pivoted, as indicated at 88, to an upright frame structure 90 suitably carried in fixed relation above the vehicle frame assembly 12.

Figure 3:
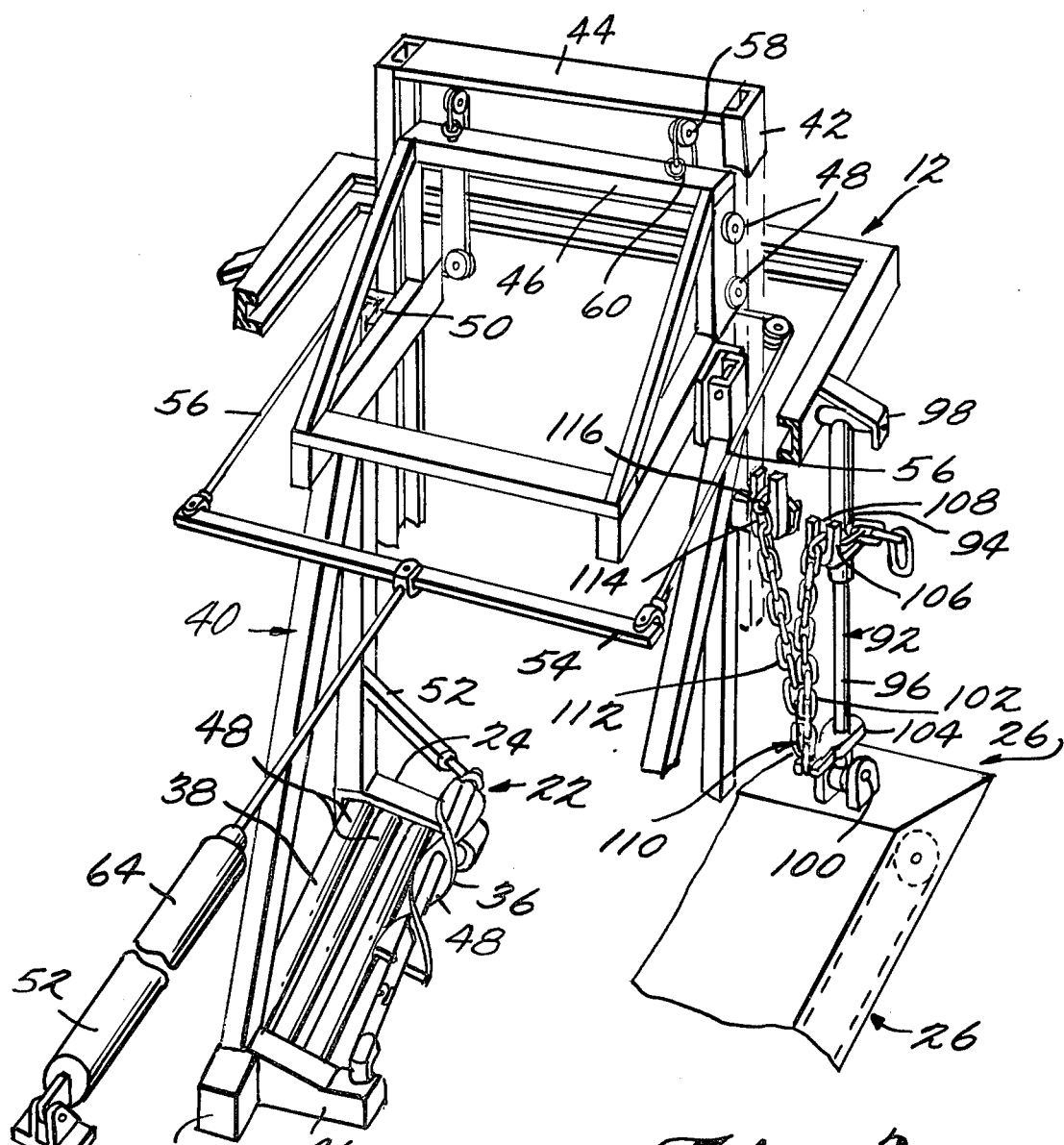
FIG. 3 is a fragmentary perspective view illustrating the arrangement embodying the principles of the present invention for raising and lowering the front end of the longitudinal conveyor assemblies of the combine.

Referring now more particularly to FIG. 3, the forward end of each conveyor assembly 26 is supported from the vehicle frame assembly 12 by a manually adjustable strut assembly 92. As shown, each strut assembly includes a pair of telescopic tubular elements 94 and 96. As shown, the upper telescopic element 94 has its upper end pivoted to the vehicle frame assembly 12 as indicated at 98, and extends downwardly therefrom. The lower telescopic element 96 is freely slidable in the larger upper element 94 and has its lower end pivoted to the forward end of the conveyor assembly 26, as indicated at 100. In addition, each adjustable strut assembly 92 includes a length of chain 102, the lower end of which is fixed in operative relationship with respect to the forward end of the conveyor assembly 26. As shown, this connection is in the form of bracket 104 fixed to the lower end of the lower telescopic element 96 receiving the lower link of the chain therethrough. The opposite end of the length of chain 102 is adapted to be adjustably suspended in operative relation with the frame assembly 12. As shown, this connection includes an L-shaped bracket 106 fixedly secured to the lower end of the telescopic element 94. The upper leg of the L-shaped bracket 106 has an upwardly opening notch or slot 108 formed therein of a size to permit any selected one of the links of the length of chain 102 from engaging therein in such a way that a pull on one of the interconnected links will cause the other interconnected link to engage the leg of the bracket defining the opening and thus prevent further separation of the telescopic elements 94 and 96. In this way, each manually adjustable strut assembly 92 suspendingly supports the forward end of the associated conveyor assembly 26 against movement below the operating level selected by virtue of the link of the associated chain 102 engaged within the associated slot 108 while at the same time permitting a vertical movement upwardly from the selected operating level.

In accordance with the principles of the present invention, a lost motion suspension means, generally indicated at 110, is provided between the associated defoliating units 22 and the forward end of each conveyor assembly 26. Each lost motion suspension means is operable to enable the piston and cylinder unit 52 to move the associated defoliator units 22 vertically within an operating range without effecting any vertical movement of the forward end of either of the associated conveyor assemblies 26. This functional attribute of each lost motion suspension means 110 enables the defoliator units to be moved independently of the conveyor assemblies 26 and 28 during normal operation to accommodate the particular height on each stalk from which the leaves are to be removed. In addition to providing this operative function, each lost motion suspension means 110 also enables the forward end of the associated conveyor assembly 26 to be raised above its selected position of manual adjustment in response to an upward movement of the associated defoliator units 22 by the piston and cylinder unit 52 when the latter is moved upwardly above its predetermined operating range. This functional attribute enables the operator to effect a raising movement of the forward end of the conveyor assemblies 26 in conjunction with a raising movement of the rearward ends thereof by the operation of the piston and cylinder unit 78 when required to effect a desired clearance as at the end of a row or the like. Moreover, this movement enables the manually adjustable telescopic strut units 92 to be manually adjusted while out of supporting relation with the forward end of the associated conveyor assemblies.

An important aspect of the present invention resides in the simplicity of the construction of the lost motion suspension means 110 which achieves in conjunction with the other components all of the desired functional attributes noted above. As shown, each lost motion suspension means includes simply a second length of chain 112, the lower end of which, as shown, is fixed to the bracket 104. The upper end of each chain 112 is adjustably engaged within a bracket 114 fixed to the associated defoliator unit frame 40 providing an upwardly open notch or slot 116. Each bracket 114 has a slot 116 therein which cooperates with the second length of chain 112 in a similar fashion to the cooperation between slot 108 in bracket 106 with chain 102.

Since the improvements of the present invention relate to the manner in which the conveyor assemblies 26 and 28 are mounted for vertical movement, the actual detailed construction embodied in each of these assemblies is not described, since the assemblies may be of any desired conventional configuration. In this regard, see, for example, the details of construction set forth in U.S. Pat. No. 3,772,862.

The improvements of the present invention would provide a particularly advantageous mode of operation when the combine 10 is being initially used in a field to harvest the leaves which are the lowest on the stalk, the so-called "sand lugs". In order to reach these leaves the defoliating units will be operated as the vehicle frame moves along the field at a lowermost range of operation requiring the lowest setting for the conveyor assemblies 26. Under these circumstances, the piston and cylinder unit 78 controlling the raising and lowering of the conveyor assemblies 26 and 28 is fully retracted and the piston and cylinder unit 52 which effects movement of the defoliating units 22 is operated within a range of movements adjacent its fully extended position. The adjustable strut assemblies 92 are set so that the forward ends of conveyor assemblies 26 are supported in a position below the lateral leaf receiving mechanisms 38 to receive the leaves moved laterally thereby. Chain 112 is adjusted so as to be slack at the lowermost position of the range of movement of the defoliator units 22 and to become taut at the upper end of this range of movement. With these adjusted positions selected, the operator then procedes down the field row operating the controls to raise and lower the defoliating units as required. When the operator reaches the end of the row and is in a situation where ground clearance is required as aforesaid, the controls for both hydraulic piston and cylinder units 52 and 78 are actuated so as to raise the upright conveyor assemblies 28 together with the rearward ends of the longitudinal conveyor assemblies 26 and the forward ends of the latter by virtue of the lost motion suspension means 110 and specifically chains 112 becoming taut and moving the forward ends of the conveyor assemblies 26 upwardly with the defoliator units 22. After the turning operation has been completed and the vehicle frame assemby 12 has been positioned for another run through the field, the controls for the hydraulic piston and cylinder units 52 and 78 are actuated to lower the upright conveyor assemblies 28 and defoliating units 22 which has the effect of lowering the longitudinal conveyor assemblies 26 into their lowermost position and shifting the support of the forward ends of the conveyor assemblies 26 from the chains 112 of the lost motion suspension means 110 to the chains 102 of the manually adjustable strut assemblies 92.

It will be understood that later during the season when it is desired to operate the machine at a higher level of adjustment, the manual adjustment of the chains 102 of the manually adjustable strut assemblies 92 is effected after the operator has actuated the controls for the hydraulic piston and cylinder unit 52 to raise the defoliating units 22 and transfer the support of the forward ends of the conveyor assemblies 26 to the chains 112. During this movement chains 102 become slack so that it is a simple procedure for the operator to select a new position of adjustment for these chains 102 within the slots 108 in brackets 106.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:
1. A tobacco combine comprising
a frame operable to be moved along a row of tobacco plants in a tobacco field,
a pair of cooperating power driven mechanical tobacco defoliating units mounted on said frame for (1) movement therewith along the row of tobacco plants on opposite sides of a predetermined vertical extent of the stalks of the tobacco plants for removing tobacco leaves attached to the portion of the stalks within said predetermined vertical extent and (2) vertical movements with respect to said frame within (a) an operative range for varying said predetermined vertical extent of the stalks and (b) above said operating range for clearance purposes,
power operated means for effecting the vertical movements of said defoliator units within said operating range and above,
each of said defoliating units including leaf handling means for directing the removed tobacco leaves laterally away from the row of tobacco plants,
a power driven longitudinal conveyor assembly disposed laterally outwardly from each leaf handling means for receiving leaves directed laterally thereby and moving the same rearwardly,
manually adjustable means extending between said frame and the forward end of each of said longitudinal conveyor assemblies for supporting the same from said frame against downward movement below a selected position of adjustment but permitting upward movement above said selected position of adjustment, and
lost motion means operatively connected between said defoliator units and the forward end of each of said longitudinal conveyor assemblies for (1) enabling said power operated means to move said pair of defoliating units vertically within said operating range without effecting any vertical movement of the forward end of either of said longitudinal conveyor assemblies and (2) effecting an upward movement of the forward end of each of said longitudinal conveyor assemblies above the selected position of adjustment thereof in response to the upward movement of said defoliator units by said power operated means upwardly above the predetermined operating range of vertical movements thereof and by so doing to transfer the support of the front end of each of said longitudinal conveyor assemblies from said manually adjustable means to said lost motion means thereby enabling said manually adjustable means to be manually adjusted while out of supporting relation with the forward end of the associated longitudinal conveyor assembly.

2. A tobacco combine as defined in claim 1 wherein the rearward end of each longitudinal conveyor assembly is supported by the lower cooperating end of an upright conveyor assembly for conveying the leaves received from the rearward end of the associated longitudinal conveyor upwardly to an elevated discharge position on said frame,
means for mounting said upright conveyor assemblies on said frame for vertical movement, and
second power operated means for effecting vertical movements of said upright conveyor assemblies and hence the rearward ends of said longitudinal conveyor assemblies supported thereby.

3. A tobacco combine as defined in claim 2 wherein said manually adjustable means for each longitudinal conveyor assembly includes a strut formed of freely telescopic strut members and a length of chain operatively adjustably connected between said strut members for limiting extensible movement of said telescopic strut members.

4. A tobacco combine as defined in claim 3 wherein each of said chains is adjustably connected with respect to one of the associated strut members by a plate fixed thereto having a slot therein for receiving any selected link of the associated chain in such a way as to prevent chain biased movement of an adjacent link.

5. A tobacco combine as defined in claim 4 wherein said lost motion means for each longitudinal conveyor assembly comprises a second length of chain operatively adjustably connected between said longitudinal conveyor assembly and the associated defoliator unit.

6. A tobacco combine as defined in claim 5 wherein each of said second chains is adjustably connected with respect to the associated defoliator unit by a second plate fixed thereto having a second slot therein for receiving any selected link of the associated second chain in such a way as to prevent chain biased movement of an adjacent link.

7. A tobacco combine as defined in claim 2 wherein said lost motion means for each longitudinal conveyor assembly comprises a length of chain operatively adjustably connected between said longitudinal conveyor assembly and the associated defoliator unit.

8. A tobacco combine as defined in claim 7 wherein each of said chains is adjustably connected with respect to the associated defoliator unit by a plate fixed thereto having a slot therein for receiving any selected link of the associated chain in such a way as to prevent chain biased movement of an adjacent link.

9. A tobacco combine as defined in claim 1 wherein said manually adjustable means for each longitudinal conveyor assembly includes a strut formed of freely telescopic strut members and a length of chain operatively adjustably connected between said strut members for limiting extensible movement of said telescopic strut members.

10. A tobacco combine as defined in claim 9 wherein each of said chains is adjustably connected with respect to one of the associated strut members by a plate fixed thereto having a slot therein for receiving any selected link of the associated chain in such a way as to prevent chain biased movement of an adjacent link.

11. A tobacco combine as defined in claim 10 wherein said lost motion means for each longitudinal conveyor assembly comprises a second length of chain operatively adjustably connected between said longitudinal conveyor assembly and the associated defoliator unit.

12. A tobacco combine as defined in claim 11 wherein each of said second chains is adjustably connected with respect to the associated defoliator unit by a second plate fixed thereto having a second slot therein for receiving any selected link of the associated second chain in such a way as to prevent chain biased movement of an adjacent link.

13. A tobacco combine as defined in claim 1 wherein said lost motion means for each longitudinal conveyor assembly comprises a length of chain operatively adjustably connected between said longitudinal conveyor assembly and the associated defoliator unit.

14. A tobacco combine as defined in claim 13 wherein each of said chains is adjustably connected with respect to the associated defoliator unit by a plate fixed thereto having a slot therein for receiving any selected link of the associated chain in such a way as to prevent chain biased movement of an adjacent link.

* * * * *